United States Patent
Hada

(10) Patent No.: US 11,142,314 B2
(45) Date of Patent: Oct. 12, 2021

(54) FLYING MACHINE AND CONTROL METHOD OF FLYING MACHINE

(71) Applicant: FUJITSU LIMITED, Kawasaki (JP)

(72) Inventor: Yoshiro Hada, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 409 days.

(21) Appl. No.: 16/364,357

(22) Filed: Mar. 26, 2019

(65) Prior Publication Data
US 2019/0329884 A1 Oct. 31, 2019

(30) Foreign Application Priority Data
Apr. 27, 2018 (JP) .............................. JP2018-087557

(51) Int. Cl.
*B64C 39/02* (2006.01)
*B64C 27/08* (2006.01)

(52) U.S. Cl.
CPC .......... *B64C 39/024* (2013.01); *B64C 39/022* (2013.01); *B64C 27/08* (2013.01); *B64C 2201/06* (2013.01); *B64C 2201/127* (2013.01); *B64C 2201/148* (2013.01); *B64C 2201/165* (2013.01)

(58) Field of Classification Search
CPC ................................ B64C 39/022; B64F 5/02
USPC ..................................................... 244/17.23
See application file for complete search history.

(56) References Cited

U.S. PATENT DOCUMENTS

| | | | |
|---|---|---|---|
| 4,505,346 A * | 3/1985 | Mueller | B62D 57/04 180/21 |
| 8,794,564 B2 * | 8/2014 | Hutson | B64C 27/006 244/17.17 |
| D761,920 S * | 7/2016 | Fargeau | D21/436 |
| 9,580,172 B2 * | 2/2017 | Hobart | B60F 5/006 |
| 9,725,158 B2 * | 8/2017 | Yan | B64C 39/024 |
| 9,902,493 B2 * | 2/2018 | Simon | B64C 29/0025 |
| 10,099,778 B2 * | 10/2018 | Sugaki | B64C 27/08 |
| 2008/0048065 A1 * | 2/2008 | Kuntz | B64C 39/024 244/17.23 |
| 2014/0131507 A1 * | 5/2014 | Kalantari | A63H 27/12 244/2 |
| 2014/0319266 A1 * | 10/2014 | Moschetta | B64C 39/024 244/13 |

(Continued)

FOREIGN PATENT DOCUMENTS

| | | |
|---|---|---|
| JP | 11-115896 | 4/1999 |
| JP | 2016-120809 | 7/2016 |
| JP | 2017-39334 | 2/2017 |

*Primary Examiner* — Christopher P Ellis
(74) *Attorney, Agent, or Firm* — Staas & Halsey, LLP

(57) ABSTRACT

A flying machine includes a plurality of rotary blades arranged in the front and rear and on the left and right, a plurality of motors configured to respectively rotate the plurality of rotary blades, contact portions located in front of the plurality of rotary blades and configured to contact a wall surface, vertical blades arranged below the plurality of rotary blades and configured so as to be capable of inclining toward a rear side or toward a front side, and so as to be capable of sliding within a range in a direction toward the front side or the rear side in a rotation area of the plurality of rotary blades and driving units configured to incline the vertical blades toward the rear side or front side, and to slide the vertical blade in a direction toward the front side or rear side.

10 Claims, 10 Drawing Sheets

(56) References Cited

U.S. PATENT DOCUMENTS

| | | | |
|---|---|---|---|
| 2016/0009381 A1* | 1/2016 | Benatar | B64C 39/024 |
| | | | 244/103 R |
| 2017/0050726 A1* | 2/2017 | Yamada | B64C 25/54 |
| 2017/0274995 A1* | 9/2017 | Yamada | B64F 3/02 |
| 2018/0057135 A1* | 3/2018 | Yan | B64D 47/08 |
| 2021/0147078 A1* | 5/2021 | Kuroiwa | B64C 27/20 |

* cited by examiner

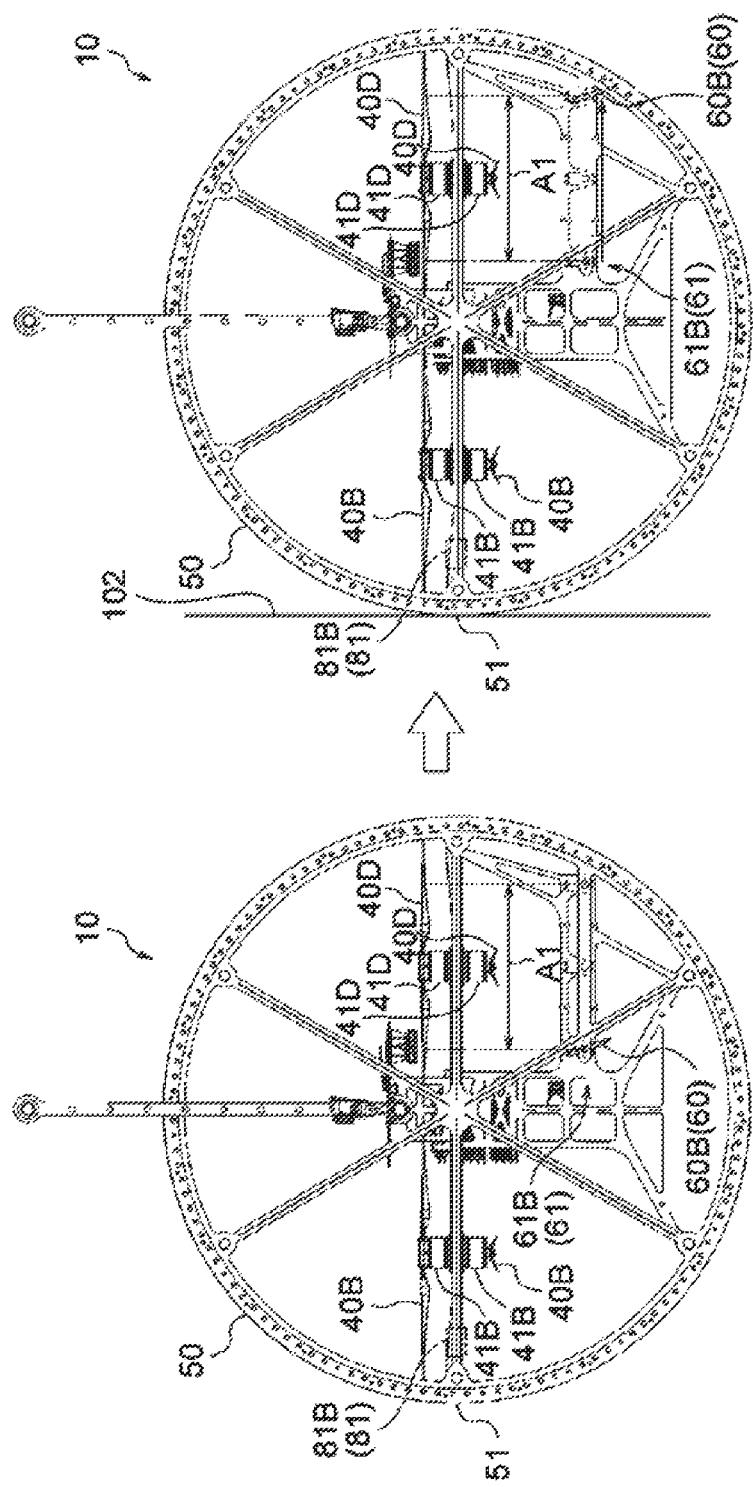

FLYING MACHINE AND CONTROL METHOD OF FLYING MACHINE

CROSS-REFERENCE TO RELATED APPLICATION

This application is based upon and claims the benefit of priority of the prior Japanese Patent Application No. 2018-87557, filed on Apr. 27, 2018, the entire contents of which are incorporated herein by reference.

FIELD

The technology disclosed in this application relates to a flying machine and a control method of a flying machine.

BACKGROUND

In recent years, flying machines called drones that have a plurality of rotary blades arranged on the front and rear, and on the left and right are beginning to be used. As such a flying machine, there has been proposed a flying machine having a pair of wheels on both the right and left sides of the plurality of rotary blades, and the flying machine moves over a vertical wall surface by this pair of wheels coming in contact with the vertical wall surface.

Incidentally, in situations in which such flying machines are used, there are cases where an external force such as a crosswind and the like acts on the flying machine. In a case where an external force acts on a flying machine in this manner, there is a possibility that the pair of wheels will become separated from the vertical wall surface. Therefore, as a way for keeping the pair of wheels in contact with the vertical wall surface, it is conceivable to apply a pressing force to the pair of wheels in a direction toward the vertical wall surface by tilting the flying machine forward.

However, when the flying machine is tilted forward, the thrust generated by the plurality of rotary blades is divided into a vertical downward force and a horizontal direction force, so the vertical thrust decreases. On the other hand, when the forward angle of inclination of the flying machine is reduced in order to secure the thrust in the vertical direction, the pressing force in a direction toward the vertical wall surface decreases. Therefore, it is required that the pressing force in a direction toward the vertical wall surface be increased by applying a thrust in the horizontal direction while also maintaining the thrust in the vertical direction.

For example, as related art, Japanese Laid-open Patent Publication Nos. 2016-120809, 2017-39334, and 11-115896 are disclosed. In consideration of the situation described above, it is desirable to provide a flying machine capable of increasing the pressing force on the wall surface or the disengaging force from the wall surface while maintaining the thrust in the vertical direction.

SUMMARY

According to an aspect of the embodiments, an apparatus includes a flying machine includes a plurality of rotary blades arranged in the front and rear and on the left and right, a plurality of motors configured to respectively rotate the plurality of rotary blades, contact portions located in front of the plurality of rotary blades and configured to contact a wall surface, vertical blades arranged below the plurality of rotary blades and configured so as to be capable of inclining toward a rear side or toward a front side, and so as to be capable of sliding within a range in a direction toward the front side or the rear side in a rotation area of the plurality of rotary blades and driving units configured to incline the vertical blades toward the rear side or front side, and to slide the vertical blade in a direction toward the front side or rear side.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a view for explaining how the vertical blades slide toward the rear side in a state where the vertical blades are inclined toward the rear side in the control method of the flying machine in FIG. 1.

DESCRIPTION OF EMBODIMENTS

Figure 1:
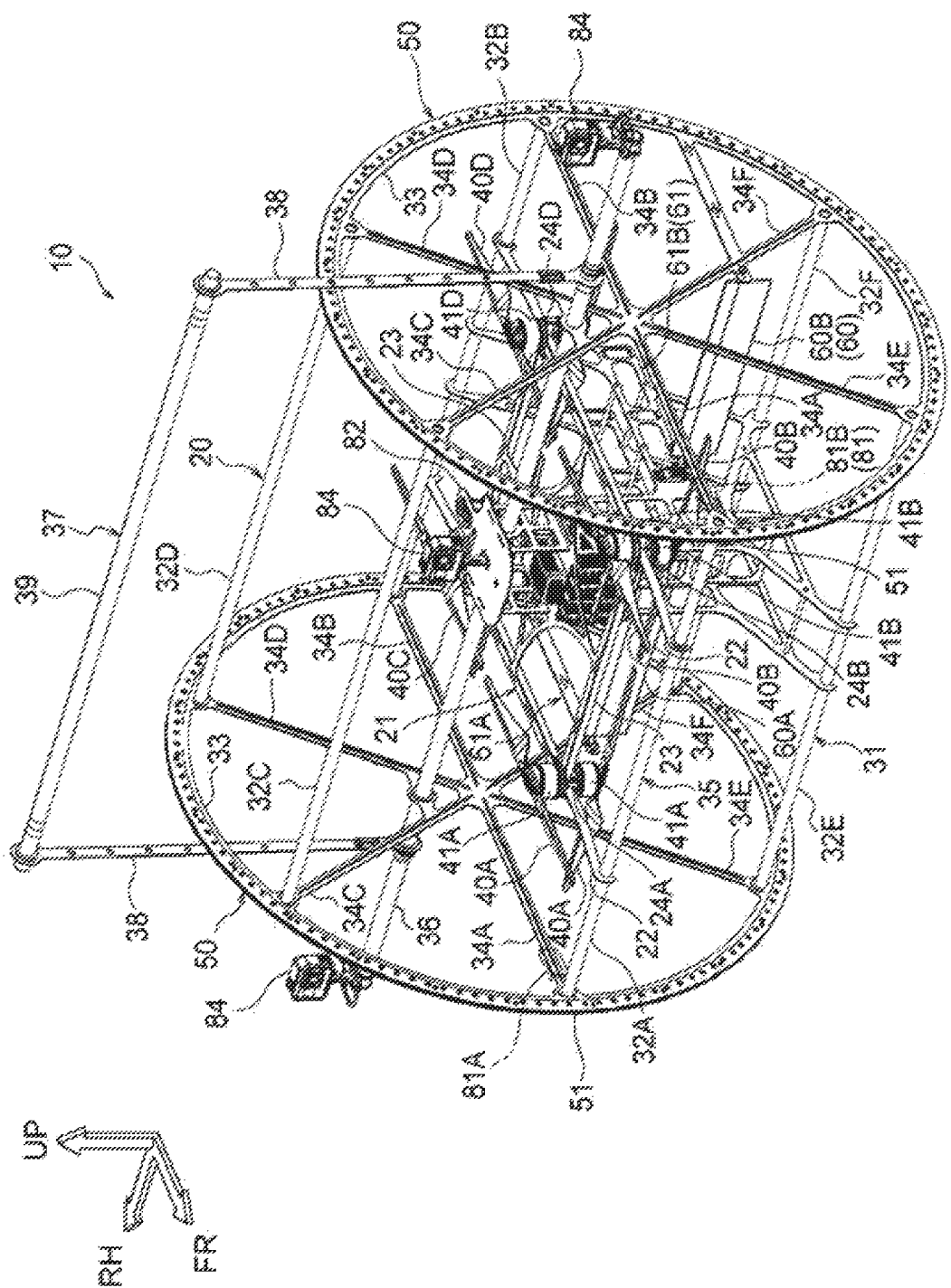
FIG. 1 is a perspective view of a flying machine according to an embodiment.
Figure 2:
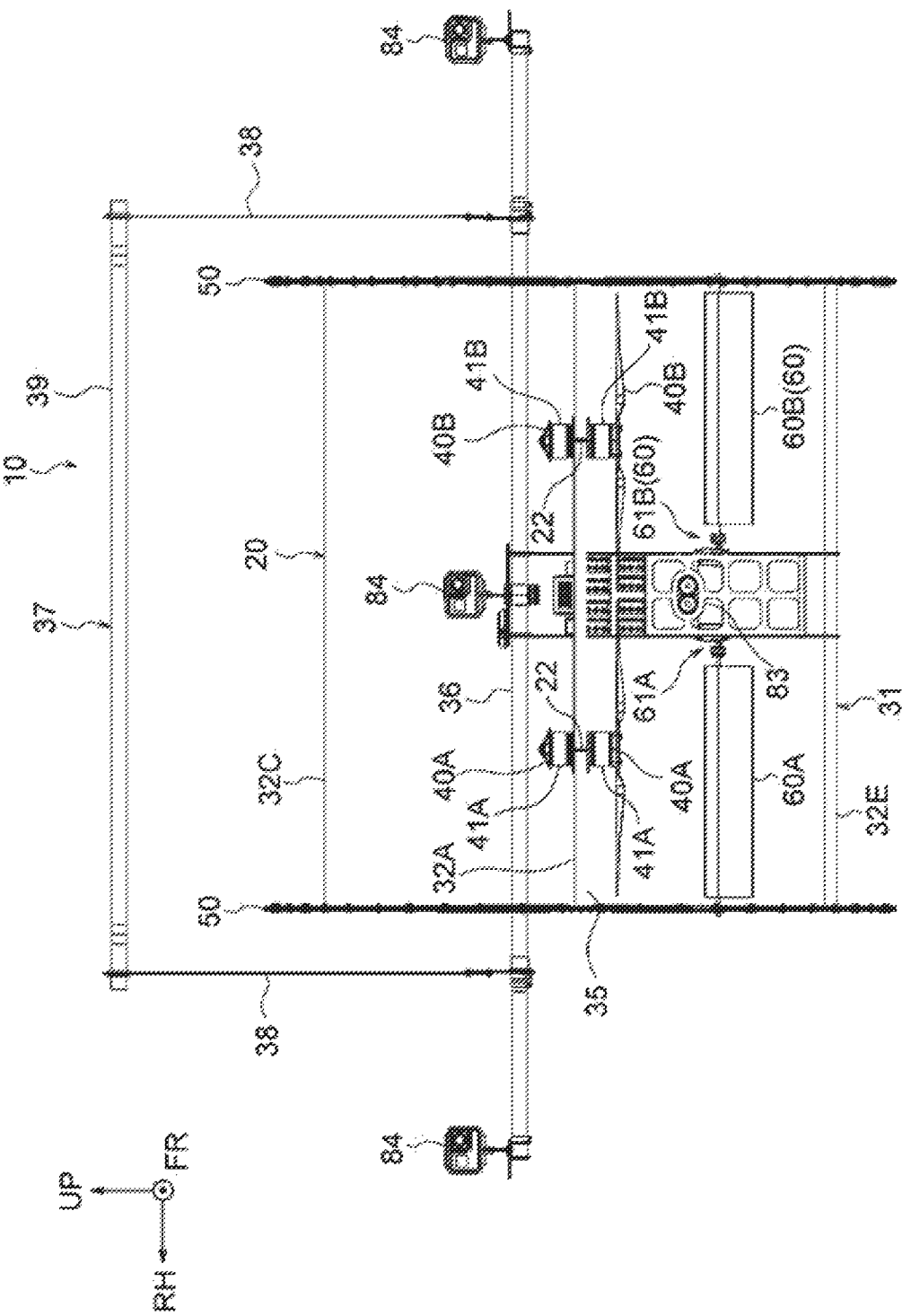
FIG. 2 is a front view of the flying machine in FIG. 1.

Hereinafter, an embodiment of the technology disclosed in this application will be described.

As illustrated in FIG. 1 to FIG. 4, a flying machine 10 according to this embodiment includes a frame 20, a plurality of rotary blades 40A to 40D, a plurality of motors 41A to 41D, and a pair of right and left independently rotatable wheels 50. The UP, FR, and RH arrows illustrated in the figures indicate the upper side in the vertical direction of the flying machine 10, the front side in the front-rear direction of the flying machine 10, and the right side in the left-right direction of the flying machine 10, respectively.

The frame 20 corresponds to the flying machine body, and has an inner-side frame 21 and an outer-side frame 31. The inner-side frame 21 is an example of a "first frame portion" and forms a frame shape when viewed from above. This inner-side frame 21 has a pair of front and rear connecting members 22 extending in the front-rear direction of the flying machine 10, and a pair of left and right connecting members 23 extending in the left-right direction of the flying machine 10.

The left and right end portions of the pair of left and right connecting members 23 are connected to a pair of front and rear connecting members 22. The pair of left and right connecting members 23 intersect the pair of front and rear connecting members 22 at the connecting portion with the pair of front and rear connecting members 22. The connecting portions between the pair of left and right connecting members 23 and the pair of front and rear connecting members 22 corresponds to intersecting portions 24A to 24D. A total of four intersecting portions 24A to 24D at four locations are formed in the inner-side frame 21. The plurality of intersecting portions 24A to 24D are arranged in the front and rear and on the left and right of the flying machine 10.

The outer-side frame 31 includes a plurality of connecting rods 32A to 32F extending in the left-right direction of the flying machine 10, a pair of annular members 33 arranged on both the left and right sides of the plurality of connecting rods 32A to 32F, and a plurality of spokes 34A to 34F provided inside the pair of annular members 33. The pair of annular members 33 form an annular shape around the left-right direction of the flying machine 10, and the plurality of spokes 34A to 34F are formed in a radial shape around the center portion of the annular members 33. The tip-end portions of the plurality of spokes 34A to 34F are connected to the annular members 33. The tip-end portions of the plurality of spokes 34A to 34F on the left side and the tip-end portions of the plurality of spokes 34A to 34F on the right side are connected by a plurality of connecting rods 32A to 32F, respectively.

The outer-side frame 31 includes a rectangular frame-like outer-side frame portion 35 that surrounds the inner-side frame 21 as seen in the top view. The outer-side frame portion 35 is formed by the plurality of spokes 34A, 34B extending in the front-rear direction of the flying machine 10 among the plurality of spokes 34A to 34F on the left and right sides, and by a front-side connecting rod 32A and a rear-side connecting rod 32B connecting to the plurality of the spokes 34A and 34B. This outer-side frame portion 35 is an example of a "second frame portion". The front-end portions of the pair of front and rear connecting members 22 are connected to the front-side connecting rod 32A, and the rear-end portions of the pair of front and rear connecting members 22 are connected to the rear-side connecting rod 32B.

The outer-side frame 31 is provided with a support rod 36 extending in the left-right direction of the flying machine 10, and a rotating member 37 rotatably supported by this support rod 36. The support rod 36 is arranged above the center portion of the pair of annular members 33 (the center portion of the plurality of spokes 34A to 34F). This support rod 36 is arranged between a pair of upper-side spokes 34C, 34D among the plurality of spokes 34A to 34F, and is fixed to this pair of upper-side spokes 34C, 34D. Both end portions of the support rod 36 penetrate though the pair of annular members 33, and protrude further to both the left and right sides of the flying machine 10 than the pair of annular members 33.

The rotating member 37 is formed in a rectangular arch shape having a pair of side rods 38 and a center rod 39 connecting the tip-end portions of the pair of side rods 38. The pair of side rods 38 are arranged further on the left and right sides of the flying machine 10 than the pair of annular members 33 and extend in the radial direction of the pair of annular members 33.

The base-end portions of the pair of side rods 38 are rotatably connected to both end portions of the support rod 36, respectively. The pair of side rods 38 are formed to have a length such that the center rod 39 may circle around the outer side in the radial direction of the pair of annular members 33. Power supply and signal transmission/reception cables, wires for avoiding falling and for limiting the movement range of the flying machine 10, and the like are connected to the center rod 39.

The plurality of rotary blades 40A to 40D are arranged two each, one above the other, at the above-described four intersecting portions 24A to 24D. For example, at the intersecting portion 24A on the front right side, the front right side rotary blades 40A are arranged one above the other, and at the intersecting portion 24B on the front left side, the front left side rotary blades 40B are arranged one above the other. At the rear right side intersecting portion 24C, the rear right side rotary blades 40C are arranged one above the other, and at the rear left side intersecting portion 24D, the rear left side rotary blades 40D are arranged one above the other.

In this manner, by arranging the plurality of rotary blades 40A to 40D two each, one above the other, at the four intersecting portions 24A to 24D, the rotary blades 40A on the front right side, the rotary blades 40B on the front left side, the rotary blades 40C on the rear right side, and the rotary blades 40D on the rear left side are aligned in the front and rear, and in the left and right of the flying machine 10. Each of the plurality of rotary blades 40A to 40D is arranged with the vertical direction of the flying machine 10 as the axial direction.

Hereinafter, the front right side rotary blades 40A and the front left side rotary blades 40B are referred to as the front side rotary blades 40A, 40B, the rear right side rotary blades 40C and the rear left side rotary blades 40D are referred to as the rear side rotary blade 40C, 40D in some cases. The front right side rotary blades 40A and the rear right side rotary blades 40C are referred to as the right side rotary blades 40A, 40C, and the front left side rotary blades 40B and the rear left side rotary blades 40D are referred to as the left side rotary blades 40C, 40D in some cases. The front side rotary blades 40A, 40B and the rear side rotary blades 40C, 40D are symmetrically arranged in the front and rear, and the right side rotary blades 40A, 40C and the left side rotary blades 40C, 40D are symmetrically arranged on the left and right.

The plurality of motors 41A to 41D are fixed two each, one above the other, at the above-described four intersecting portions 24A to 24D. Each of the plurality of motors 41A to 41D is arranged with the vertical direction of the flying machine 10 as the axial direction. The above-described plurality of rotary blades 40A to 40D are fixed to output shafts of the plurality of motors 41A to 41D, respectively. The plurality of motors 41A to 41D rotate the plurality of rotary blades 40A to 40D, respectively. The plurality of motors 41A to 41D may independently adjust the rotational speeds of the plurality of rotary blades 40A to 40D.

The front right side rotary blades 40A and the rear left side rotary blades 40D rotate in the same direction, and the front left side rotary blades 40B and the rear right side rotary blades 40C rotate in a direction opposite to the rotating direction of the front right side rotary blades 40A and the rear left side rotary blades 40D. That is, among the plurality of rotary blades 40A to 40D, the rotary blades adjacent to each other in the front-rear direction or the left-right direction of the flying machine 10 rotate in different directions.

The pair of wheels 50 are rotatably supported by the annular members 33 over the entire circumference. This pair of wheels 50, by being supported by the annular members 33, are arranged on the left and right sides of the plurality of rotary blades 40A to 40D. The front end portions of this pair of wheels 50 are positioned in front of the plurality of rotary blades 40A to 40D as seen in a side view of the flying machine 10. As will be described in detail later, the pair of wheels 50 travel on a vertical wall surface, and the front end portions of the pair of wheels 50 correspond to the contact portions 51 that come in contact with the vertical wall surface.

Figure 5:
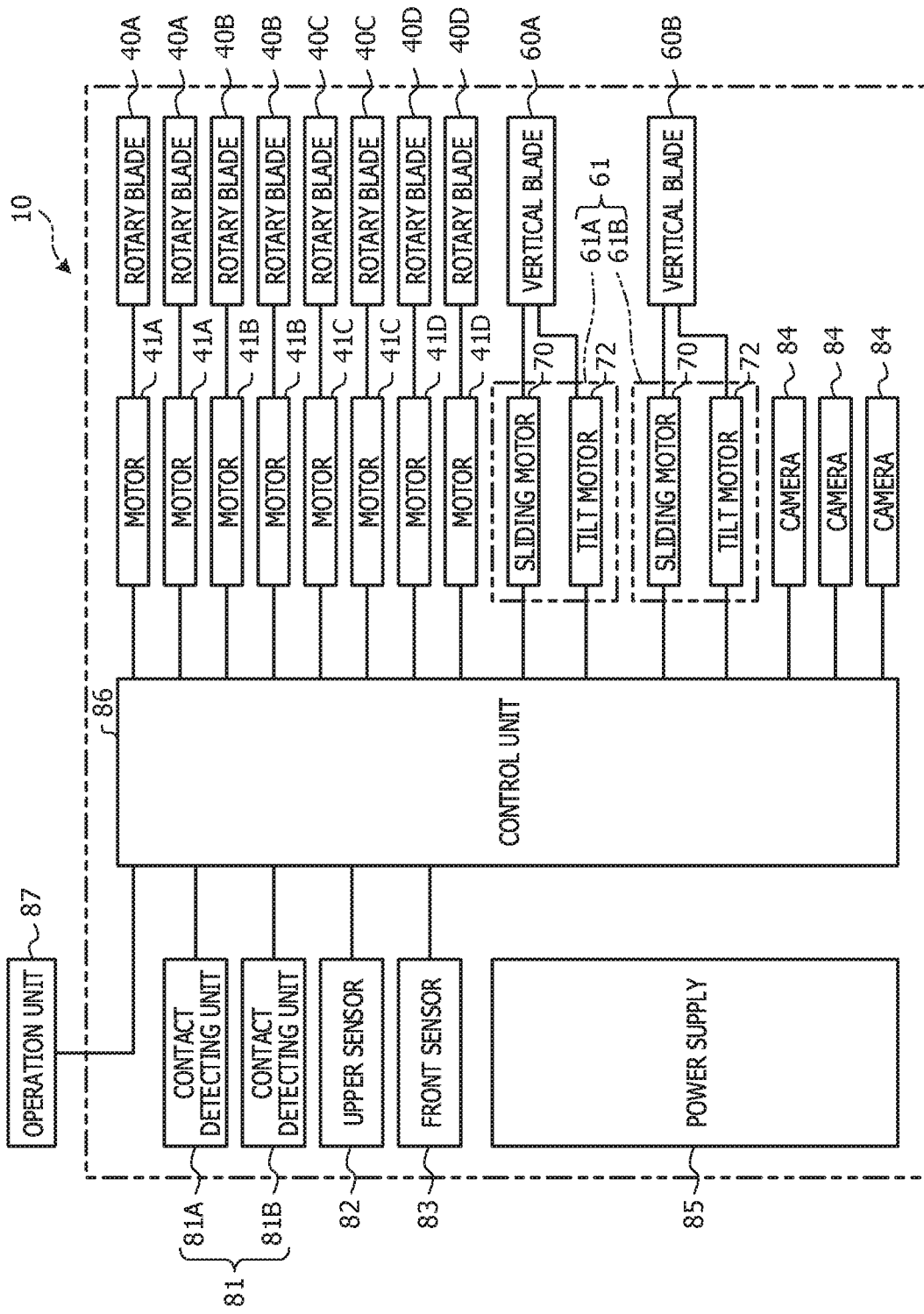
FIG. 5 is a block diagram illustrating a configuration of the flying machine in FIG. 1.

The flying machine 10 according to this embodiment includes vertical blades 60 and driving units 61 (refer also to FIG. 5). More specifically, the vertical blades 60 include a right-side vertical blade 60A arranged below the rear right side rotary blades 40C, and a left-side vertical blade 60B arranged below the rear left side rotary blades 40D. The driving units 61 include a right-side driving unit 61A for inclining the right-side vertical blade 60A forward and backward, and a left-side driving unit 61B for inclining the left-side vertical blade 60B forward and backward.

Figure 6:
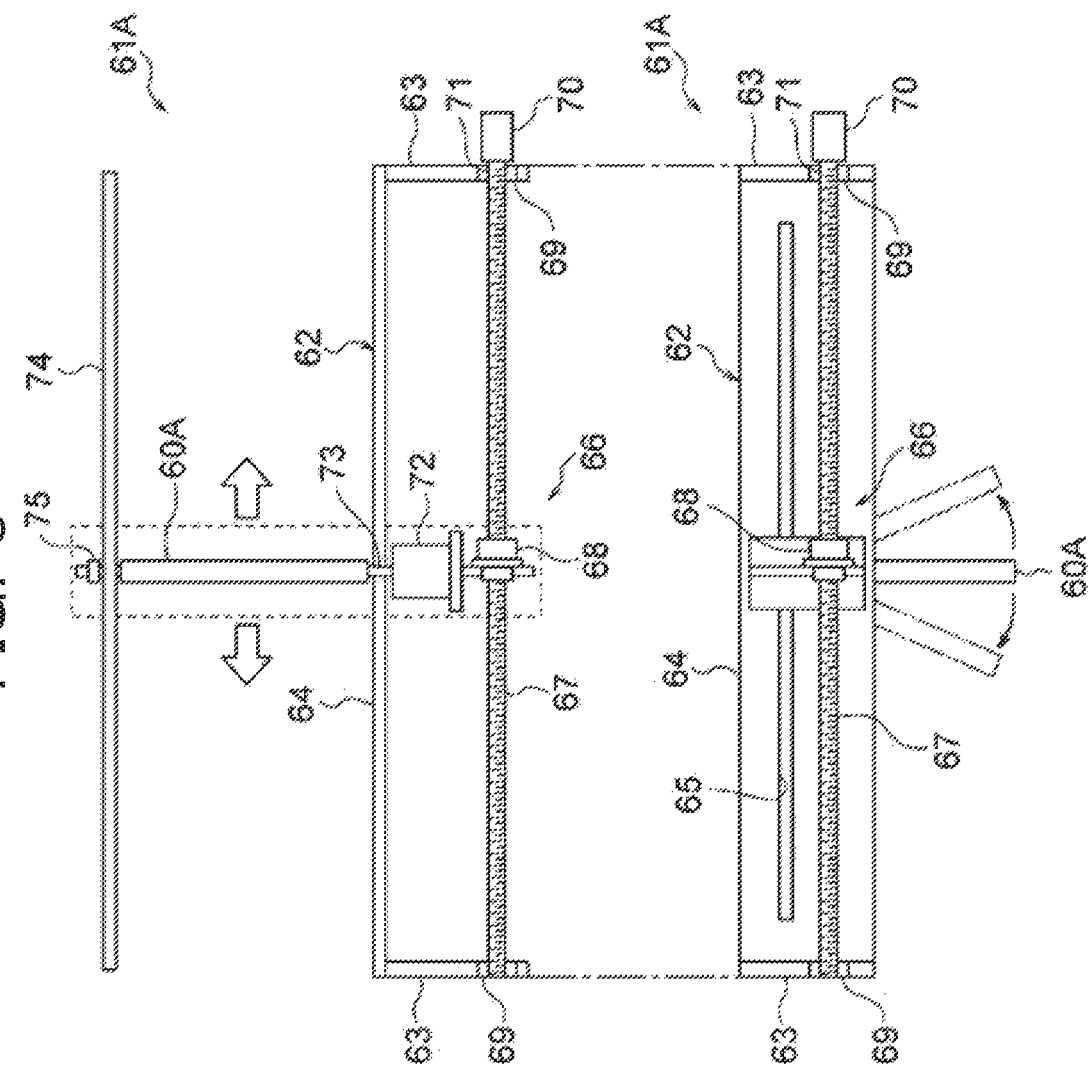
FIG. 6 is a two-view diagram of the right-side vertical blade and the driving unit of the flying machine in FIG. 1.

Here, in FIG. 6, the vertical blade 60A and the driving unit 61A on the right side are illustrated in two views (top view and left side view). As illustrated in FIG. 6, the vertical blade 60A is formed in a flat plate shape extending in the left-right direction. The driving unit 61A includes a support member 62, a ball screw mechanism 66, a sliding motor 70, a tilt motor 72, and a guide rail 74.

The support member 62 has a pair of opposing walls 63 facing in the front-rear direction and a side wall portion 64 connecting the pair of opposing walls 63. The ball screw mechanism 66 has a screw shaft 67 and a nut 68. The screw shaft 67 extends in the front-rear direction and is rotatably supported by the pair of opposing walls 63 via bearings 69. The nut 68 is screwed onto the screw shaft 67. As an example, the sliding motor 70 is fixed to the opposing wall 63 on the rear side. The screw shaft 67 is integrally provided on the output shaft 71 of the sliding motor 70.

The tilt motor 72 is fixed to the nut 68. A slit 65 extending in the front-rear direction is formed in the side wall portion 64, and the output shaft 73 of the tilt motor 72 is inserted in the slit 65. The guide rail 74 is provided along the side wall portion 64, and the vertical blade 60A is arranged between the side wall portion 64 and the guide rail 74. The vertical blade 60A is usually arranged vertically along the vertical direction. The output shaft 73 of the tilt motor 72 is fixed to the upper end portion of the vertical blade 60A. The tip-end portion of the output shaft 73 is movably connected to the guide rail 74 by a stopper member 75 or the like.

In the driving unit 61A, when the sliding motor 70 is operated and the output shaft 71 rotates in one direction, the nut 68 slides forward along the screw shaft 67 as the screw shaft 67 rotates. When the sliding motor 70 is operated and the output shaft 71 rotates in the other direction, the nut 68 slides backward along the screw shaft 67 as the screw shaft 67 rotates. The tilt motor 72 and the vertical blade 60A slide forward and backward together with the nut 68.

In this driving unit 61A, the tilt motor 72 is operated and when the output shaft 73 rotates in one direction, the vertical blade 60A is inclined toward the front side, and when the output shaft 73 rotates in the other direction, the vertical blade 60A is inclined toward the rear side. In this embodiment, inclination of the vertical blade 60A such that the lower end portion of the vertical blade 60A moves toward the rear side with the output shaft 73 of the tilt motor 72 as a fulcrum corresponds to the vertical blade 60A inclining toward the rear side. Inclination of the vertical blade 60A such that the lower end portion of the vertical blade 60A moves toward the front side with the output shaft 73 of the tilt motor 72 as a fulcrum corresponds to the vertical blade 60A inclining toward the front side.

As illustrated in FIG. 1 to FIG. 4, the left-side vertical blade 60B is arranged below the rear left side rotary blades 40D. The configuration and arrangement of the left-side vertical blade 60B and the driving unit 61B are symmetrical with respect to the right-side vertical blade 60A and the driving unit 61A, however the explanation thereof will be omitted. Hereafter, the right-side vertical blade 60A and the left-side vertical blade 60B may be collectively referred to as vertical blades 60 in some cases. The right-side driving unit 61A and the left-side driving unit 61B may be collectively referred to as driving units 61 in some cases.

Figure 3:
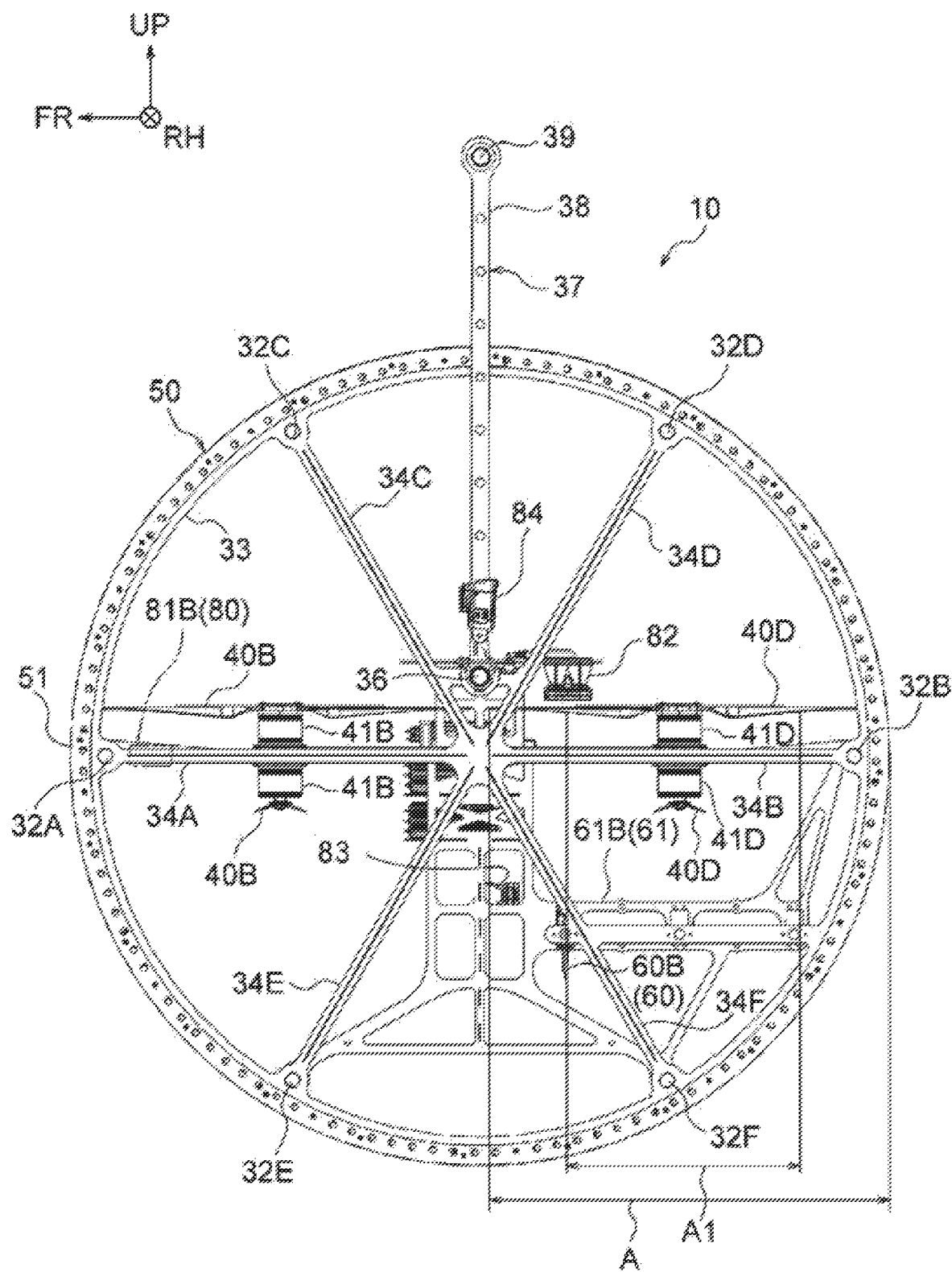
FIG. 3 is a left-side view of the flying machine in FIG. 1.
Figure 4:
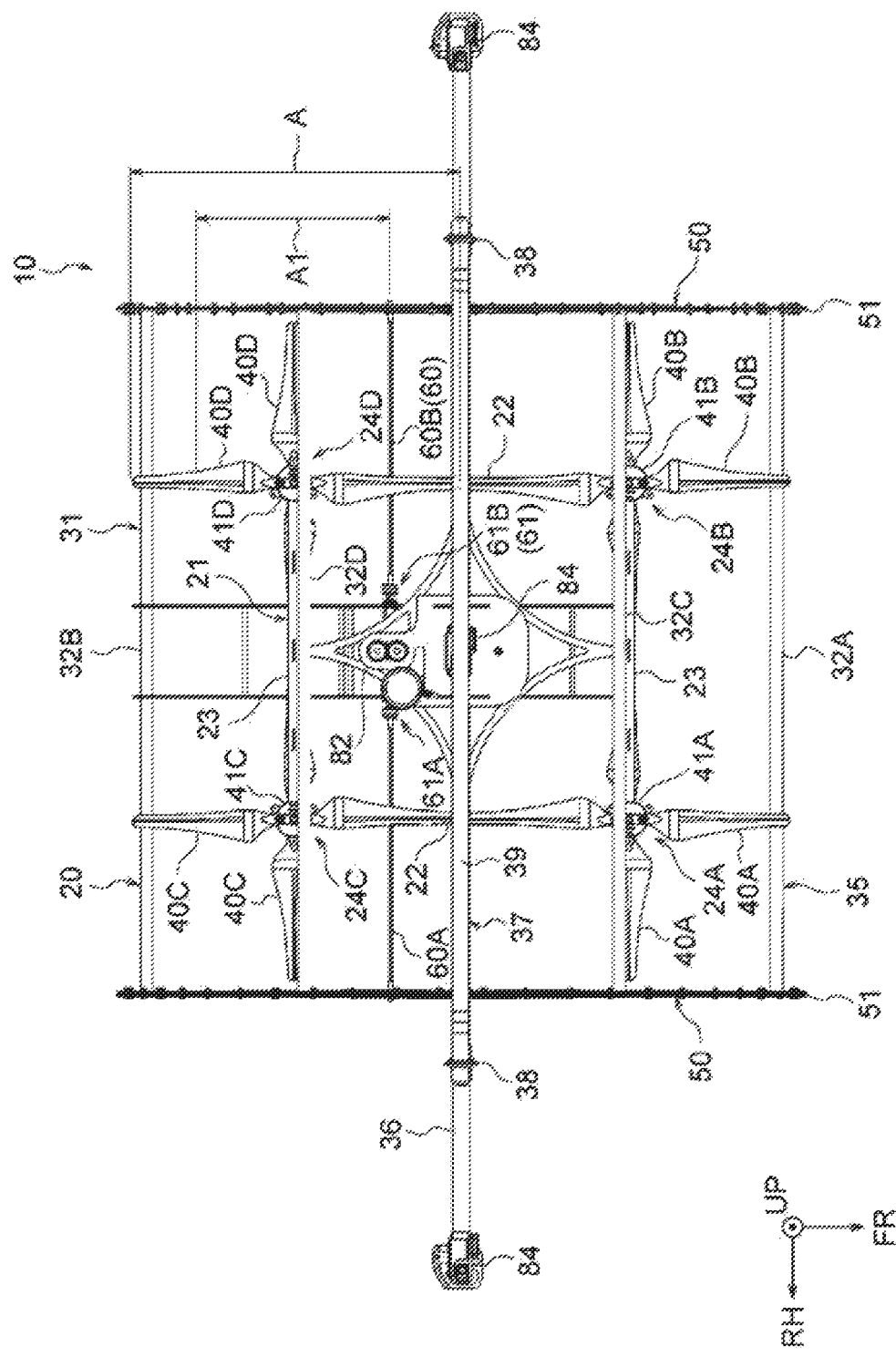
FIG. 4 is a top view of the flying machine in FIG. 1.

As illustrated in FIG. 3 and FIG. 4, the above-described vertical blades 60 are arranged on the lower side of the rear-side rotary blades 40C and 40D, and are able to slide from the front side toward the rear side within a range A in the front-rear direction in the rotation area of the rear-side rotary blades 40C, 40D. As an example, in this embodiment, the sliding range in the front-rear direction of the vertical blades 60 is a range A1 that is narrower in the front-rear direction than the range A. The position of the rear end of the range A1 is, for example, set further on the front side than the position of the rear end of the range A by a length corresponding to about 30% of the total length of the blade on one side of the rear-side rotary blades 40C, 40D. When the vertical blades 60 slide to the position of the rear end of this range A1, as will be described later, in a case where the air that flows from the upper side to the lower side as the rear-side rotary blades 40C, 40D rotate hits the vertical blade 60, a large pressing force in a direction toward the vertical wall surface may be obtained.

The rotation areas of the rear-side rotary blades 40C, 40D correspond to the inner sides of the rotational locus of the tip ends of a pair of blades provided on the rear-side rotary blades 40C, 40D, respectively. The range A in the front-rear direction in the rotation area of the rear-side rotary blades 40C, 40D corresponds to the range of lengths of a pair of blades along the front-rear direction of the flying machine 10 when the pair of blades of the rear-side rotary blades 40C, 40D are respectively parallel to the front-rear direction of the flying machine 10.

The right-side vertical blade 60A and the left-side vertical blade 60B included in the vertical blades 60 may be independently inclined forward and backward and independently slid forward and backward. By synchronously operating the right-side driving unit 61A and the left-side driving unit 61B, the right-side vertical blade 60A and the left-side vertical blade 60B may be synchronously inclined forward or backward, and may be synchronously slid forward or backward.

As illustrated in FIG. 5, the flying machine 10 according to this embodiment includes a contact detecting unit 81, an upper sensor 82, a front sensor 83, a plurality of cameras 84, a power supply 85, and a control unit 86.

As an example, the contact detecting unit 81 includes a right-side contact detecting unit 81A and a left-side contact detecting unit 81B. The right-side contact detecting unit 81A and the left-side contact detecting unit 81B are for detecting that the contact portions 51, which are the front-end portions of the pair of wheels 50, are in contact with the vertical wall surface. The right-side contact detecting unit 81A and the left-side contact detecting unit 81B output a contact detection signal to the control unit 86 when it is detected that the contact portions 51 are in contact with the vertical wall surface.

For example, strain gauges are used for the right-side contact detecting unit 81A and the left-side contact detecting unit 81B. In a case where strain gauges are used for the right-side contact detecting unit 81A and the left-side contact detecting unit 81B, the right-side contact detecting unit 81A and the left-side contact detecting unit 81B are positioned in the vicinity of the contact portions 51, for example, are set on the front-end portions of the front-side spokes 34A on both the left and right sides (refer to FIG. 1). Hereafter, the right-side contact detecting unit 81A and the left-side contact detecting unit 81B may be collectively referred to as a contact detecting unit 81 in some cases.

The upper sensor 82 is for detecting an object located above the flying machine 10, and the front sensor 83 is for detecting an object located in front of the flying machine 10. The upper sensor 82 is arranged facing upward from the flying machine 10, and the front sensor is arranged facing forward from the flying machine 10. Various types of sensors may be used for the upper sensor 82 and the front sensor 83.

The plurality of cameras 84 are for capturing images in front of the flying machine 10 and are arranged on the left and right sides of the flying machine 10 so as to face the front of the flying machine 10. As an example, the plurality of cameras 84 are respectively fixed to the center portion and both end portions of the support rod 36 (refer to FIG. 1).

The control unit 86, the operation unit 87, and the power supply 85 are only illustrated in FIG. 5. The control unit 86 is realized by an electronic circuit (computer) that includes, for example, a calculating unit and a storage unit. This control unit 86 is electronically connected to the contact detecting unit 81, the upper sensor 82, the front sensor 83, the plurality of cameras 84, the plurality of motors 41A to 41D (flight motors), a pair of sliding motors 70, and a pair of tilt motors 72. This control unit 86 is connected to the operation unit 87 so as to be able to receive operation signals. The operation of this control unit 86 will be described later.

The power supply 85 is configured so as to be able to supply electric power to the above-described contact detecting unit 81, the upper sensor 82, the front sensor 83, the plurality of cameras 84, the plurality of motors 41A to 41D, the pair of sliding motors 70, the pair of tilt motors 72, and the control unit 86. The control unit 86 and the power supply 85 may be mounted in the frame 20 or may be mounted in an operating device installed near an operator. In a case where the control unit 86 and the power supply 85 are mounted in an operation device installed near the operator, the control unit 86 and the power supply 85 are electrically connected via a cable or the like to a relay board mounted in the frame 20, for example.

Next, a control method for controlling the flying machine 10 of this embodiment will be described together with an example of a method for using the flying machine 10.

Figure 7:
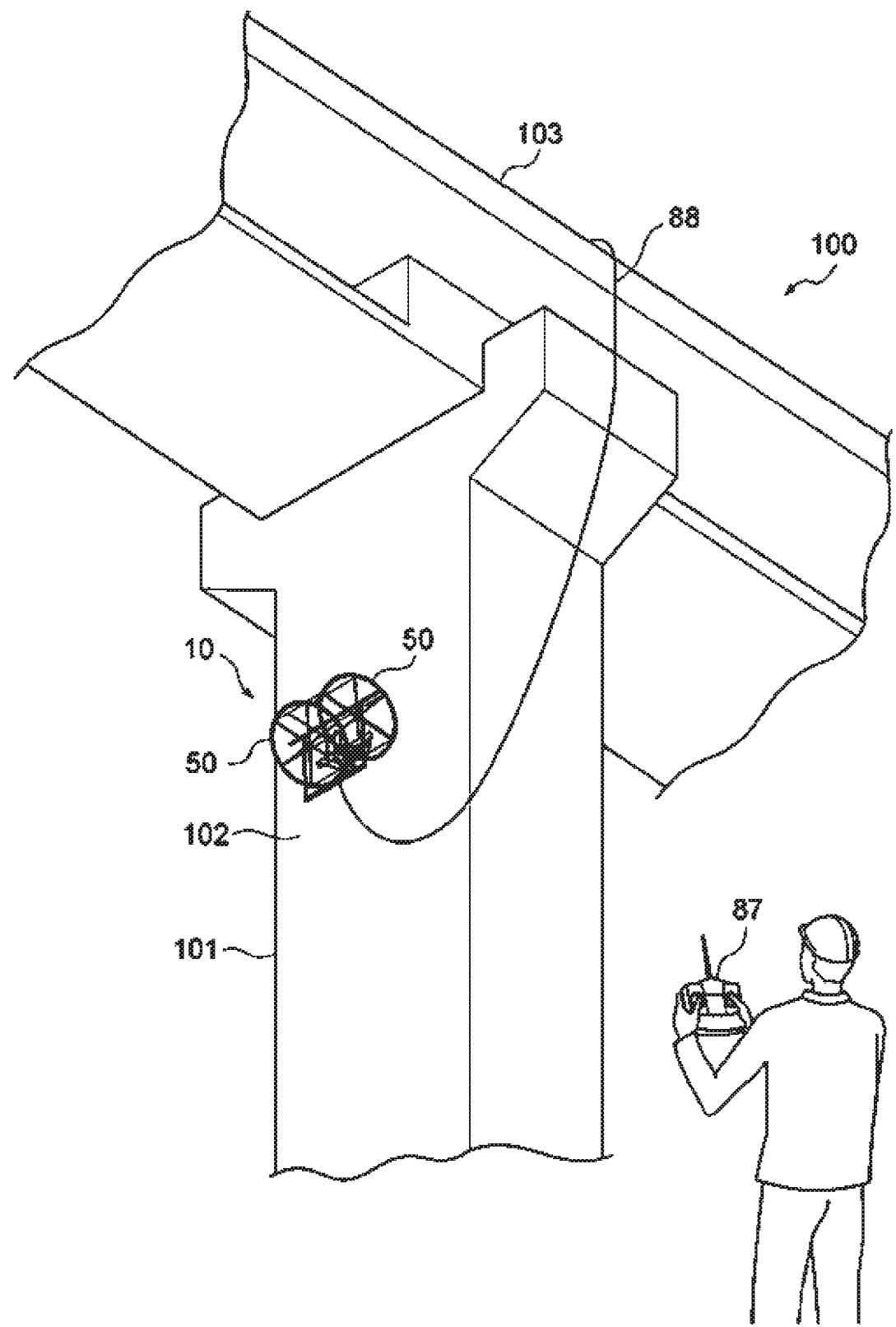
FIG. 7 is a diagram illustrating an example of how to use the flying machine in FIG. 1.

FIG. 7 illustrates an example of how to use the flying machine 10 in FIG. 1. FIG. 7 does not illustrate the detailed structure of the flying machine 10, so in the following description, the detailed structure of the flying machine 10 will be described by appropriately referring to FIG. 1 to FIG. 6.

As illustrated in FIG. 7, in an example of the method of using the flying machine 10 according to the present embodiment, the flying machine 10 flies toward the vertical wall surface 102 of a bridge pier 101 provided for a bridge 100, and the pair of wheels 50 is brought into contact with the vertical wall surface 102 so that the flying machine 10 moves up or down the vertical wall surface 102. In this embodiment, as an example, the control unit 86 and the power supply 85 are placed on the bridge girder 103, and the control unit 86 and the power supply 85 are connected via a cable 88 to the main body portion of the flying machine 10. The flying machine 10 flies according to the operation of the operation unit 87 by the operator. When the flying machine 10 moves on the vertical wall surface 102, for example, the plurality of cameras 84 capture images of the vertical wall surface 102.

In such a state of using the flying machine 10, an external force such as a crosswind or the like may act on the flying machine 10. When an external force acts on the flying machine 10 in this way, there is a possibility that the pair of wheels 50 will become separated from the vertical wall surface 102 and images of the vertical wall surface 102 will not be appropriately captured by the plurality of cameras 84. Therefore, as a way for keeping the pair of wheels 50 in contact with the vertical wall surface 102, a pressing force may be applied to the pair of wheels 50 in a direction toward the vertical wall surface 102 by tilting the flying machine 10 forward.

However, when the flying machine 10 is tilted forward, the thrust generated by the plurality of rotary blades 40A to 40D is divided into a vertical downward force and a horizontal direction force, so the thrust in the vertical direction decreases. On the other hand, when the forward angle of inclination of the flying machine 10 is reduced in order to maintain the thrust in the vertical direction, the pressing force toward the vertical wall surface 102 decreases. Therefore, it is required to enhance the pressing force toward the vertical wall surface 102 while maintaining the thrust in the vertical direction.

Figure 8:
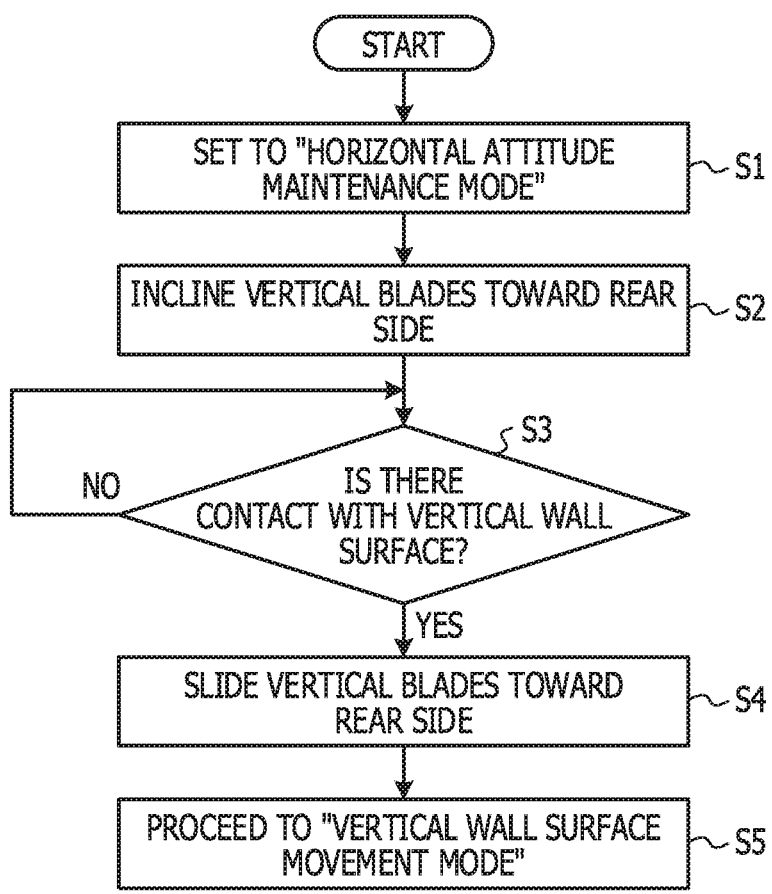
FIG. 8 is a diagram illustrating the flow of processing by the control unit applied to the flying machine in FIG. 1.

Therefore, in the present embodiment, in a case where the flying machine 10 flies towards the vertical wall surface 102, the pair of wheels 50 are brought into contact with the vertical wall surface 102, and the flying machine 10 moves on the vertical wall surface 102, the flying machine 10 is controlled as described below. More specifically, in the control method for controlling the flying machine 10 according to the present embodiment, the control unit 86 executes steps S1 to S5 illustrated in FIG. 8 according to the operation of the operation unit 87. Hereafter, steps S1 to S5 will be described in order.

In step S1, the control unit 86 is set to the "horizontal attitude maintenance mode". In the "horizontal attitude maintenance mode", the control unit 86 controls the plurality of motors 41A to 41D so that the flying machine 10 is maintained in a horizontal attitude, and adjusts the rotational speeds of the plurality of rotary blades 40A to 40D.

Figure 9:
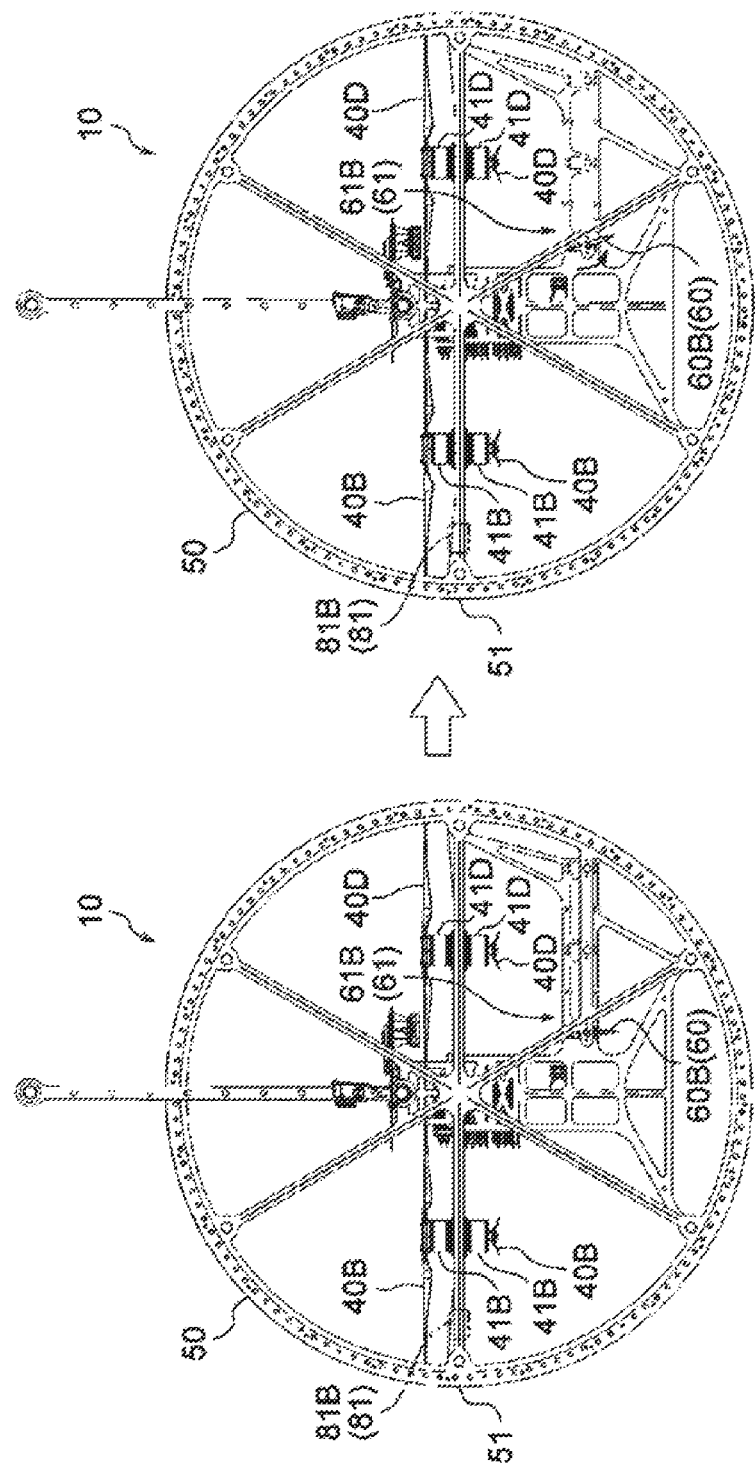
FIG. 9 is a view for explaining a state in the control method of the flying machine in FIG. 1 in which the vertical blades are inclined toward the rear side at a position before the vertical blades slide toward the rear side.

In step S2, the control unit 86 controls the tilt motor 72 so as to incline the vertical blades 60 toward the rear side (refer to FIG. 9) so that the flying machine 10 flies toward the vertical wall surface 102. At this time, the control unit 86 does not control the sliding motor 70, so the vertical blades 60 are inclined to the rear side at a position before sliding to the rear side. When the vertical blades 60 are inclined toward the rear side as described above, the wind flowing from the upper side to the lower side in accordance with the rotation of the rear-side rotary blades 40C, 40D hits the vertical blades 60, so a thrust in the forward direction is generated in the flying machine 10. As a result, the flying machine 10 flies toward the vertical wall surface 102.

When the wind flowing from the upper side to the lower side in accordance with the rotation of the rear-side rotary blades 40C, 40D hits the vertical blades 60, a rotational force toward the rear side in the rolling direction acts on the flying machine 10, and as a result there is a possibility that the attitude of the flying machine 10 will become inclined backward. In a case where the rotational force toward the rear side in the rolling direction is strong, there is a possibility that the flying machine 10 may be turned over.

Therefore, in step S2, in order to cancel the rotational force toward the rear side in the rolling direction acting on the flying machine 10, the plurality of motors 41A to 41D are controlled so that the rotational speeds of the rear-side rotary blades 40C, 40D become higher than the rotational speeds of the front-side rotary blades 40A, 40B. At this time, the rotational speeds of the front-side rotary blades 40A, 40B may be decreased, and the rotational speeds of the rear-side rotary blades 40C, 40D may be increased, or the rotational speeds of the front-side rotary blades 40A, 40B may be kept as they are, and the rotational speeds of the rear-side rotary blades 40C, 40D may be increased.

When the rotational speeds of the rear-side rotary blades 40C, 40D become higher than those of the front-side rotary blades 40A, 40B in this way, the upward thrust by the rear-side rotary blades 40C, 40D becomes larger than the upward thrust by the front-side rotary blades 40A, 40B. Therefore, a rotational force toward the front side in a rolling direction acts on the flying machine 10. Since the rotational force toward the rear side in a rolling direction is canceled by the rotational force toward the front side in a rolling direction, the flying machine 10 is maintained in the horizontal attitude.

In step S3, the control unit 86 determines whether or not the pair of wheels 50 (the contact portions 51) have touched the vertical wall surface 102 based on the detection result of the contact detecting unit 81. In a case where it is determined that the pair of wheels 50 are not yet in contact with the vertical wall surface 102, the control unit 86 repeatedly executes step S3 until the pair of wheels 50 come in contact with the vertical wall surface 102. On the other hand, when the pair of wheels 50 come in contact with the vertical wall surface 102, the contact detecting unit 81 detects that the pair of wheels 50 are in contact with the vertical wall surface 102, and the control unit 86 determines that the pair of wheels 50 are in contact with the vertical wall surface 102. When the control unit 86 determines that the pair of wheels 50 are in contact with the vertical wall surface 102, the control unit 86 proceeds to step S4.

In step S4, the control unit 86 controls the sliding motor 70 to cause the vertical blades 60 to slide toward the rear side in a state of being inclined toward the rear side (refer to FIG. 10). When the vertical blades 60 slide toward the rear side in a state of being inclined toward the rear side in this way, the moment length from the vertical wall surface 102 to the vertical blades 60 increases, and it becomes difficult for turbulent flow along the vertical wall surface 102 to affect the vertical blades 60. Therefore, in comparison with a case where the vertical blades 60 are in a position before sliding toward the rear side, the thrust in the forward direction acting on the flying machine 10 increases, so the pressing force in a direction toward the vertical wall surface 102 increases.

In step S5, the control unit 86 is set to the "vertical wall surface movement mode". In the "vertical wall surface 102 movement mode", the vertical blades 60 are maintained in a state of being slid toward the rear side in a state of being inclined toward the rear side. The control unit 86 controls the plurality of motors 41A to 41D to adjust the rotational speeds of the plurality of rotary blades 40A to 40D so that the flying machine 10 is maintained in the horizontal attitude. Furthermore, the control unit 86 controls the plurality of motors 41A to 41D and adjusts the rotational speeds of the plurality of rotary blades 40A to 40D so that the flying machine 10 moves vertically on the vertical wall surface 102 in accordance with the operation of the operation unit 87.

Next, the operation and effect of the present embodiment will be described.

As described in detail above, with the flying machine 10 according to the present embodiment, in a case where the flying machine 10 flies toward the vertical wall surface 102, at a position before sliding toward the rear side, the vertical blades 60 incline toward the rear side. Therefore, wind that flows from the upper side to the lower side in accordance with the rotation of the rear-side rotary blades 40C, 40D hits the vertical blades 60, so a thrust in the forward direction is generated in the flying machine 10. As a result, it is possible to cause the flying machine 10 to fly toward the vertical wall surface 102.

When the wind flowing from the upper side to the lower side in accordance with the rotation of the rear-side rotary blades 40C, 40D hits the vertical blades 60, a rotational force toward the rear side in the rolling direction acts on the flying machine 10, and as a result there is a possibility that the attitude of the flying machine 10 will become inclined backward. In a case where the rotational force toward the rear side in the rolling direction is strong, there is a possibility that the flying machine 10 may be turned over.

However, in a case where the vertical blades 60 are inclined toward the rear side, of the plurality of rotary blades 40A to 40D, the rotational speeds of the rear-side rotary blades 40C, 40D are adjusted to become higher than the rotational speeds of the front-side rotary blades 40A, 40B. Therefore, the upward thrust by the rear-side rotary blades 40C, 40D becomes larger than the upward thrust by the front-side rotary blades 40A, 40B, so a rotational force toward the front side in the rolling direction acts on the flying machine 10. As a result, the rotational force toward the rear side in the rolling direction may be canceled by the rotational force toward the front side in the rolling direction, so the flying machine 10 may be maintained in the horizontal attitude.

The flying machine 10 may be maintained in the horizontal attitude, so, in a state where external forces such as a crosswind acts on the flying machine 10, the thrust force of the plurality of rotary blades 40A to 40D may be maintained even in a case where the plurality of motors 41A to 41D are controlled so that a rotational force around the yaw axis acts on the flying machine 10. As a result, it is possible to rotate the flying machine 10 around the yaw axis against external forces.

In a case where the pair of wheels 50 make contact with the vertical wall surface 102, the vertical blades 60 slide toward the rear side in a state of being inclined toward the rear side. When the vertical blades 60 slide toward the rear side in a state of being inclined toward the rear side in this way, the moment length from the vertical wall surface 102 to the vertical blades 60 increases, and it becomes difficult for turbulent flow along the vertical wall surface 102 to affect the vertical blades 60. As a result, in comparison with a case where the vertical blades 60 are in a position before sliding toward the rear side, the thrust in the forward direction acting on the flying machine 10 increases, so the pressing force in a direction toward the vertical wall surface 102 may be increased.

It is unnecessary to set the flying machine 10 in the forward inclined attitude in order to obtain the pressing force against the vertical wall surface 102, so it is possible to ensure thrust in the vertical direction.

The vertical blades 60 include a right-side vertical blade 60A and a left-side vertical blade 60B that are independent from each other, and the right-side vertical blade 60A and the left-side vertical blade 60B are independently inclined toward the front or rear side by the right-side driving unit 61A and the left-side driving unit 61B. Therefore, by inclining the right-side vertical blade 60A and the left-side vertical blade 60B in mutually different directions, the flying machine 10 may be rotated around the yaw axis.

The inner-side frame 21 of the frame 20 has a pair of front and rear connecting members 22 extending in the front and rear directions, and a pair of left and right connecting members 23 extending in the left and right directions, and forms a frame shape when viewed from above. The plurality of motors 41A to 41D are fixed to the intersecting portions 24A to 24D of the pair of front and rear connecting members 22 and the pair of left and right connecting members 23, respectively. Therefore, of the plurality of rotary blades 40A to 40D, the rotary blades 40A to 40D that are adjacent to each other in the front-rear direction or the left-right direction of the flying machine 10 are rotating in mutually different directions, and the vibrations of the adjacent rotary blades 40A to 40D are transmitted to each other by the portions of the inner-side frame 21 located between the adjacent rotary blades 40A to 40D. The adjacent rotary blades vibrate with the phases reversed with respect to each other, so by setting the lengths of the frames 21 and 23 to, for example, the multiplied wavelengths of representative vibration frequencies, the vibrations of adjacent rotary blades 40A to 40D (motors 41A to 41D) may be canceled.

The outer-side frame 31 of the frame 20 has a rectangular frame shape surrounding the inner-side frame 21 as viewed in a top view, and includes an outer-side frame portion 35 that is connected to the inner-side frame 21. Therefore, the vibrations of the adjacent rotary blades 40A to 40D are also transmitted to each other by the outer-side frame portion 35. As a result, the vibrations of the adjacent rotary blades 40A to 40D (motors 41A to 41D) may be more effectively canceled.

Next, a modified example of the present embodiment will be described.

In the embodiment described above, when the flying machine 10 flies towards the vertical wall surface 102, the vertical blades 60 are inclined toward the rear side at a position before the vertical blades 60 slide toward the rear side, and then, in a case where the pair of wheels 50 come in contact with the vertical wall surface 102, the vertical blades 60 are inclined toward the rear side. However, after the pair of wheels 50 come in contact with the vertical wall surface 102, the vertical blades 60 may incline toward the rear side and slide toward rear side, or before the pair of wheels 50 come in contact with the vertical wall surface 102, the vertical blades 60 may incline toward the rear side and slide toward the rear side.

In a case where the vertical blades 60 incline toward the rear side and slide toward the rear side, the operation may be such that the vertical blades 60 incline toward the rear side and then slide toward the rear side, may be such that the vertical blades 60 slide toward the rear side while inclining toward the rear side, or may be such that the vertical blades 60 slide toward the rear side and then incline toward the rear side.

The sliding range of the vertical blades 60, in addition to extending from the center in the A direction, extends in the direction of the opposite rotary blades 40A, 40B, and the vertical blades 60 may be slid to the side that is opposite to the direction in which the thrust in the horizontal direction is to be applied and inclined to the outside. In this way, thrust in the horizontal direction may be easily applied while keeping the flying machine 10 horizontal (thrust may be selectively applied in the front or rear direction). By being able to apply thrust in the horizontal direction in a state where the horizontal attitude is maintained, the horizontal state on the vertical wall surface before coming in contact with the vertical wall surface may be maintained, and images may be captured by a camera while moving.

Although the number of the plurality of rotary blades 40A to 40D is presumed to be four, it may be two, three, or five or more. The number of the plurality of motors 41A to 41D may also be two, three, or five or more corresponding to the number of the plurality of rotary blades 40A to 40D.

The pair of wheels 50 are provided on the left and right sides of the frame 20, and portions of the pair of wheels 50 that protrude in front of the plurality of rotary blades 40A to 40D are formed as contact portions 51 that come in contact with the vertical wall surface 102. However, the wheels 50 may be provided in front of the frame 20, and the whole of the wheels 50 may be formed as contact portions. A structure other than the wheels 50 may be provided in the frame 20 as contact portions.

In a case where the vertical blades 60 are inclined to the rear side, of the plurality of rotary blades 40A to 40D, the rotational speeds of the rear-side rotary blades 40C, 40D may be set so as to be higher than the rotational speeds of the front-side rotary blades 40A, 40B. However, for example, in a case where contact portions exhibiting a binding force are in contact with the vertical wall surface 102 and the inclined attitude toward the rear side of the flying machine 10 may be suppressed by the binding force of the contact portions, the rotational speeds of the plurality of rotary blades 40A to 40D may be the same.

The vertical blades 60 include a right-side vertical blade 60A and a left-side vertical blade 60B that are independent from each other, however, the vertical blades 60 may have a configuration in which the right-side vertical blade 60A and the left-side vertical blade 60B are integrated.

The vertical blades 60 slide within a range A1 that is narrower in the front-rear direction than the front-rear direction of the range A in the rotation area of the rear-side rotary blades 40C, 40D. However, in a case where wind flowing from the upper side to the lower side in accordance with the rotation of the rear-side rotary blades 40C, 40D hits the vertical blades 60, as long as a pressing force toward the vertical wall surface may be obtained, the vertical blades 60 may slide within the range A. The vertical blades 60 may slide within the range in the front and rear direction in the rotation areas of the plurality of rotary blades 40A to 40D including the front-side rotary blades 40A, 40B and the rear-side rotary blades 40C, 40D. The sliding range of the vertical blades 60 may be appropriately adjusted.

The contact detecting unit 81 includes a right-side contact detecting unit 81A and a left-side contact detecting unit 81B, however, in the flying machine 10, a contact detecting unit 81 that is common to both the left and right sides may be used.

Both end portions of the pair of the left and right connecting members 23 terminate at the connecting portions with the pair of front and rear connecting members 22. However, both the end portions of the pair of left and right connecting members 23 may be respectively connected to the plurality of spokes 34A to 34F on the left and right sides, beyond the connecting portions with the pair of front and rear connecting members 22. The inner-side frame 21, which is an example of the "first frame portion", may have a lattice shape when viewed from above.

The outer-side frame portion 35, which is an example of the "second frame portion", has a rectangular frame shape when viewed from above, but may also have a frame shape other than a rectangular shape when viewed from above.

In one example of the method of using the flying machine 10 described above, the flying machine 10 moves on a vertical wall surface 102 formed on a bridge pier 101 of a bridge 100, however, may also move on a vertical wall surface 102 formed on a surface other than a bridge pier 101 of a bridge 100. The flying machine 10 moves with a vertical wall surface 102 as a target, however, may also move on a wall surface that is not vertical.

Images of the vertical wall surface 102 are captured by using the flying machine 10 having the cameras 84, however, the operation performed by the flying machine 10 on the vertical wall surface 102 is not limited to capturing images and may be at least any one of inspection, observation, recording, checking, transportation, painting, marking, and other work.

Among the plurality of modifications described above, combinable modifications may be combined and implemented as appropriate.

An embodiment of a technique disclosed in the present application has been described above, however, the technique disclosed in the present application is not limited to that described above, and of course various modifications other than the above, may be made without departing from the spirit and scope of this disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A flying machine comprising:
   a plurality of rotary blades arranged in the front and rear and on the left and right;
   a plurality of motors configured to respectively rotate the plurality of rotary blades;
   contact portions located in front of the plurality of rotary blades and configured to contact a wall surface;
   vertical blades arranged below the plurality of rotary blades and configured so as to be capable of inclining toward a rear side or toward a front side, and so as to be capable of sliding within a range in a direction toward the front side or the rear side in a rotation area of the plurality of rotary blades; and
   driving units configured to incline the vertical blades toward the rear side or front side, and to slide the vertical blade in a direction toward the front side or rear side.

2. The flying machine according to claim 1, further comprising:
   a memory; and
   a processor coupled to the memory and configured to:
   control the driving units so that the vertical blades incline toward the rear side; and
   in a case where the vertical blades are inclined toward the rear side, the processor controls the plurality of motors so that, of the plurality rotary blades, the rotational speeds of the rotary blades on the rear side are higher than the rotational speeds of the rotary blades on the front side.

3. The flying machine according to claim 2, further comprising:
   contact detecting units configured to detect that the contact portions are in contact with the wall surface;
   wherein the processor is configured to:
   control the driving units so that, in a case where the flying machine flies toward the wall surface, the vertical blades incline toward the rear side before sliding toward the rear side; and
   control the driving units so that, in a case where the contact detecting units detect that the contact portions are in contact with the wall surface, the vertical blades slide toward the rear side in a state of being inclined toward the rear side.

4. The flying machine according to claim 1, wherein
   the plurality of rotary blades include front-side rotary blades and rear-side rotary blades; and
   the vertical blades are capable of sliding from the front side to the rear side within a range in the front-rear direction in the rotation area of the rear-side rotary blades.

5. The flying machine according to claim 1, wherein
   the rear-side rotary blades include rear right side rotary blades and rear left side rotary blades; and
   the vertical blades include a right-side vertical blade arranged below the rear right side rotary blades and a left-side vertical blade arranged below the rear left side rotary blades.

6. The flying machine according to claim 1, wherein
   the right-side vertical blade and the left-side vertical blade may be independently inclined toward the front or rear; and
   the driving units include a right-side driving unit configured to incline the right-side vertical blade toward the front or rear, and a left-side driving unit configured to incline the left-side vertical blade toward the front or rear.

7. The flying machine according to claim 1, further comprising:
   a pair of wheels arranged on both the right and left sides of the plurality of rotary blades and including the contact portions.

8. The flying machine according to claim 1, further comprising:
   a first frame portion configured to form a frame shape when viewed from above, and having a plurality of front and rear connecting members extending in the front-rear direction, a plurality of left and right connecting members extending in the left-right direction and intersecting with the plurality of front and rear connecting members; and
   a second frame portion configured to form a frame shape surrounding the first frame portion when viewed from above, and to connect to the first frame portion;
   wherein the plurality of motors are respectively fixed to a plurality of intersecting portions of the plurality of front and rear connecting members and the plurality of left and right connecting members.

9. A control method of a flying machine that comprises: a plurality of rotary blades arranged in the front and rear and on the left and right; a plurality of motors configured to respectively rotate the plurality of rotary blades; contact portions located in front of the plurality of rotary blades and configured to contact a wall surface; vertical blades arranged below the plurality of rotary blades and configured so as to be capable of inclining toward a rear side or toward a front side, and so as to be capable of sliding within a range in a direction toward the front side or the rear side in a rotation area of the plurality of rotary blades; and driving units configured to incline the vertical blades toward the rear side or front side, and to slide the vertical blade in a direction toward the front or rear; the control method comprising:

controlling the driving units so that the vertical blades incline toward the rear side or the front side; and controlling the driving units so that the vertical blades slide toward the rear side or the front side.

10. The control method according to claim 9, further comprising:

controlling the driving units so that the vertical blades incline toward the rear side, and in a case where the vertical blades are inclined toward the rear side, controlling the plurality of motors so that, of the plurality rotary blades, the rotational speeds of the rotary blades on the rear side are higher than the rotational speeds of the rotary blades on the front side.

* * * * *